United States Patent [19]

Thekdi

[11] 4,255,128

[45] Mar. 10, 1981

[54] CONTAINER FOR BAKING CARBON PRODUCTS

[75] Inventor: Arvind C. Thekdi, Sylvania, Ohio

[73] Assignee: Midland-Ross Corporation, Cleveland, Ohio

[21] Appl. No.: 6,598

[22] Filed: Jan. 26, 1979

[51] Int. Cl.³ .................. F27D 5/00; F27D 13/00
[52] U.S. Cl. .................. 432/5; 432/253; 432/258
[58] Field of Search ............ 432/1, 253, 258, 5; 252/510

[56] References Cited

U.S. PATENT DOCUMENTS

| | | | |
|---|---|---|---|
| 1,911,167 | 5/1933 | Smail | 432/253 |
| 3,681,818 | 8/1972 | Stefan | 432/253 |
| 4,050,880 | 9/1977 | Naito | 432/5 |
| 4,106,894 | 8/1978 | Bobleter | 432/145 |

FOREIGN PATENT DOCUMENTS 560654  10/1932  Fed. Rep. of Germany ........... 432/258

*Primary Examiner*—John J. Camby
*Attorney, Agent, or Firm*—Richard A. Negin

[57] ABSTRACT

An improved container used in baking furnaces for baking carbon products. The container has a porous base and porous walls connected to the base. A porous medium is disposed between the container and the carbon product. Volatiles and liquid tars released during the baking of the carbon products pass through the porous medium and through the porous container.

8 Claims, 2 Drawing Figures

CONTAINER FOR BAKING CARBON PRODUCTS

BACKGROUND OF THE INVENTION

The invention is in the field of carbon baking; more particularly, the invention relates to a container means in which carbon products are placed during baking.

Carbon products, such as electrodes, are made from particulate carbon mixed with a suitable binder, such as tar or pitch. The mixture is molded or formed to a desired form and baked in a furnace until the volatile matter and liquid tar are driven off and the carbon product has achieved a desired density and conductivity. When heated, during the baking, the carbon products have a tendency to soften and to deform.

To overcome the problems of deformation of the carbon products and handling the liquid tar, particularly in production of carbon electrodes, suitable containers, such as sagger cans, have been used. These sagger cans are solid metal containers shaped similarly to the electrode. When the carbon product is formed at lower temperatures, it retains its shape. It is centered in the metal can in which it will be baked. The space between the inside of the can and the outside of the electrode is filled with a mixture of coal, coke and sand particles. This process is somewhat laborous as the gap between the carbon product and the solid metal can must be manually filled. The use of coal, coke and sand particles creates atmospheric dust resulting in particulate pollution problems. The metal can is made out of a solid carbon steel or alloy steel plate. The loaded sagger can is placed in the furnace where it is raised from room temperature to approximately 1600° F. at a rate varying from 1° F. to 10° F. per hour. The sagger can supports the packed electrode so that it will not deform. Volatiles in vapor form pass through the coal, coke and sand particles to the top of the can where they leave the can and enter the furnace atmosphere. Solid carbon residue of the liquid tar released remains in the can within the mixture of coal, coke and sand particles.

The packing mixture of coal, coke and sand particles has poor heat transfer properties and the path through which the volatiles have to travel to leave the can is limited to the open top.

In U.S. Pat. No. 1,440,724, An Electrode for Electric Furnaces and Process for Manufacturing the Same by C. W. Soderberg, electrodes are manufactured by tapping or pressing a suitable electrode mass into a metallic mantle. The mantle in the preferred form serves not only as a conductor and as a protection for the electrode mass but also as a mechanical means of retaining and supporting the same. The electrodes are baked in the same furnace as they are being used. The mantle is built up of sections suitably fastened together. It is made with internally extending ribs which are provided with projections. These ribs and projections afford means of distributing current in the carbonaceous material and act as a mechanical support, therefore, to prevent slipping of the carbonaceous material in the mantle. The mantle is further preferably perforated so that gas produced by the baking may escape without deforming the mantle.

The Soderberg patent describes a special case for an electrically baked electrode. The electrode is continually formed in the furnace and is baked in part by the heat from the melting metal in the furnace and from the electric current through the mantle. There is no provision made for liquid tars released during the baking of the electrode. The electrode is consumed within the same furnace where it is being formed. Additionally, there is no provision or need for removal of the electrode from the mantle for use elsewhere.

In a carbon baking furnace, provision must be made for liquid tars released during baking and there must be the ability to remove the electrodes from the container means in which they are baked. It is desirable to bake the carbon products as efficiently as possible.

SUMMARY OF THE INVENTION

The present invention is an improvement in containers used in baking furnaces for baking carbon products. The container has a porous base and porous walls connected to the base. A porous medium is disposed between the container and the carbon product. Volatiles and liquid tars released during the baking of the carbon products pass through the porous medium and through the porous container.

It is a general object of the present invention to provide an improved container for use during the baking of carbon products which will help to improve the efficiency of the carbon baking operation. More particularly, it is the object of the present invention to increase the heating rate during the baking period and still supply the structural support necessary to prevent deformation of carbon products during baking. It is another object of the present invention to provide a method of placing the carbon products in the container with a less laborous process.

It is an object of this invention to obtain one or more of the objects set forth above. These and other objects and advantages of this invention will become apparent to those skilled in the art from the following specification and claims, reference being had to the attached drawing.

DESCRIPTION OF THE PREFERRED EMBODIMENT

Figure 1:
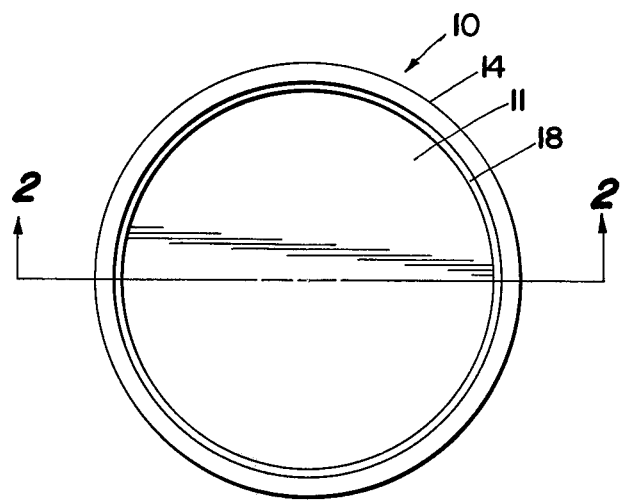
FIG. 1 is a plan view of the container of the present invention with a porous packing medium disposed between the container and the carbon product within.
Figure 2:
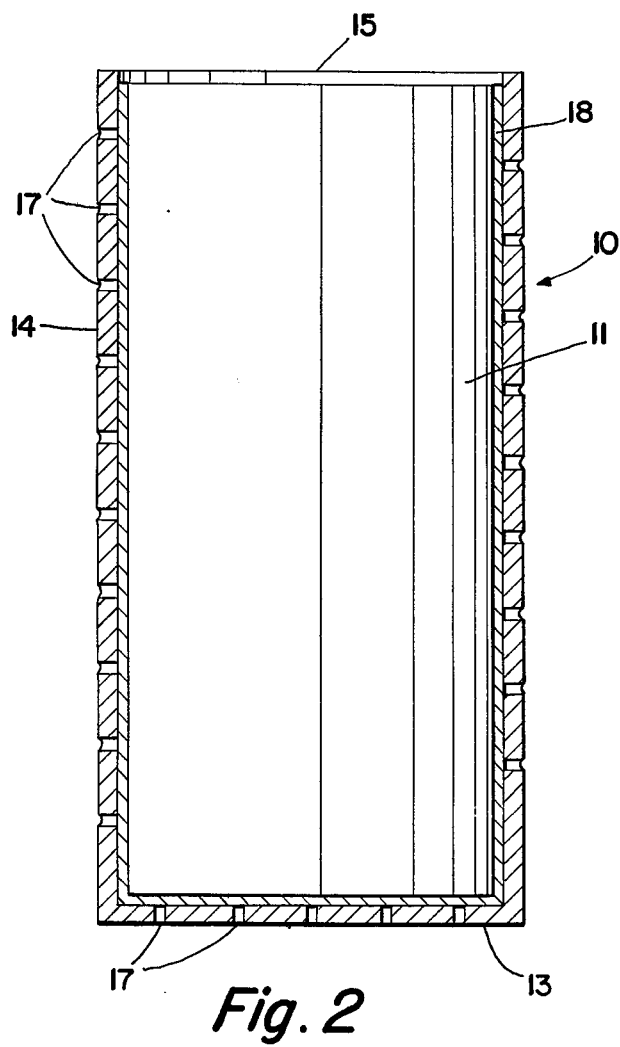
FIG. 2 is a cross section along line 2—2 of FIG. 1.

The present invention will be understood by those skilled in the art by reference to FIGS. 1 and 2 which show a plan view and cross-sectional view of one embodiment of the present invention. The present invention is a container 10 for supporting a carbon product, such as a green electrode 11 which is baked in a carbon baking furnace.

A high volume use of carbon products containing a large percentage of tar or pitch is in the manufacture of electrodes used in the arc melting of steel. The electrode 11 for this particular use is illustrated in the accompanying figures. The container 10 has a continuous porous wall 14 connected to a base and enclosing a product space. Preferably, the base 13 is porous. There is a product feed and removal opening 15 preferably at the top, through which the product can be placed in and removed from container 10.

The can can be made out of a perforated metal plate where the perforations can be holes 17 in the walls 14 and the base 13 instead of a solid metal plate as used in the prior art. Although holes are preferred any suitable porous structure can be used as long as the container maintains its structural integrity and does not allow the electrode body to deform. A porous medium 18 is disposed between the carbon electrode 11 and the container 10. The porous medium 18 is adjacent to the walls 14 and base 13 of the container 10 and between the walls 14 and base 13 of the container and the electrode 11. The porous medium 18 allows high rates of heat transfer and low resistance to volatiles and liquid tars released during the baking of the carbon product. Yet it is strong enough to withstand internal pressure generated during the devolatilization of the electrode. In the preferred embodiment, the porous medium is an organic material such as tar paper.

The container 10 has a shape of similar geometry to the green electrode 11. For example, a common shape of the electrode is cylindrical, therefore, the design of container 10 is also cylindrical.

In operation, porous medium, such as tar paper, is placed at the base of container 10. The unbaked electrode which retains its shape at room temperature, is then wrapped in a suitable porous medium, such as tar paper, outside of the container 10. The wrapped carbon product is centered in the container and the container containing the carbon product is baked in the carbon baking furnace. The porous organic medium, such as tar paper, allows a low resistance path of volatiles and liquid tars released during the heating of the electrode. The volatiles go off with the exhaust from the furnace atmosphere and the liquids are handled by suitable means known in the art. The structural container and intermediate porous medium prevents deformation of the carbon product during baking.

The volatiles and liquid tar can leave the carbon product and the container 10 through the opening 15 as well as through the porous walls and the base of the container. This allows the volatiles to escape more rapidly. Additionally, there is greater heat transfer and a possible increase in the rate of baking without cracking the main carbon body. It is speculated that the theory behind this is that the movement of the volatiles from the can surface breaks the thermal boundary layer between the can surface and atmosphere within the furnace thereby promoting of more rapid rate of heat transfer.

When prior art methods are used, the space between the inside of the can and the outside of the carbon product is filled with a mixture of coal, coke and sand particles. The mixture of coal, coke and sand allows storage and subsequent vaporization of liquids given off during carbon baking. Initially, this mixture is put at the base of the can and the carbon products centered within the can. The gap between the inner wall of the can and the outer wall of the carbon product is then manually filled with this material. Using the present invention, the carbon product is easily and quickly wrapped with a suitable porous medium, such as tar paper, outside of the container 10.

Therefore, the apparatus and method of the present invention provides a method of baking carbon products in which a more rapid rate of heat transfer can be attained and in which less labor is required.

Modifications, changes, and improvements to the preferred form to the invention herein disclosed, described and illustrated may occur to those skilled in the art who come to understand the principals precepts thereof. Accordingly, the scope of the patent to be issued herein should not be limited to the particular embodiments of the invention set forth herein, but rather should be limited by the advance of which the invention has promoted the art.

What is claimed is:

1. A container for supporting carbon products during baking in a baking furnace, where the carbon products release volatiles and liquid tars during baking, which comprises:
    a base;
    a continuous porous wall connected to the base, the wall and base enclosing a product space and having a product feed and removal opening;
    a porous medium adjacent to the walls and base of the container and between the walls and base and the carbon product, the porous medium allowing high rates of heat transfer and low resistance to volatiles and liquid tars released during the baking of the carbon product and yet strong enough to withstand internal pressure generated during devolatilization of the electrode.

2. The container as recited in claim 1 wherein the base is porous.

3. The container as recited in claim 2 wherein the porous medium is an organic medium.

4. The container as recited in claim 3 wherein the porous medium is tar paper.

5. The container as recited in claim 4 wherein the wall has a cylindrical shape.

6. A method of baking carbon products in a baking furnace, where the carbon products release volatiles and liquid tars during baking, which comprises:
    placing a porous medium on the base of a continuous porous walled container having a porous base;
    wrapping the unbaked carbon product in the porous medium;
    placing the wrapped carbon product into the container;
    baking the carbon product, in the container and porous medium, in a carbon baking furnace where the volatiles and liquid tars released during baking pass through the porous medium and out of the porous container into the baking furnace while allowing high rates of heat transfer to the carbon product.

7. The method as recited in claim 6 wherein the porous medium is tar paper, the carbon product is an electrode and the container wall has a shape similar to the electrode.

8. The container as recited in claims 1 or 5, wherein the wall and adjacent portions of a product in the space, are matingly configured so that said portions will be confined and remain substantially undistorted during baking of the product.

* * * * *